(12) United States Patent
Morishita

(10) Patent No.: US 12,519,659 B2
(45) Date of Patent: Jan. 6, 2026

(54) INFORMATION PROCESSING DEVICE, INFORMATION PROCESSING METHOD, AND RECORDING MEDIUM

(71) Applicant: NEC Corporation, Tokyo (JP)

(72) Inventor: Yusuke Morishita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 353 days.

(21) Appl. No.: 18/246,956

(22) PCT Filed: Oct. 2, 2020

(86) PCT No.: PCT/JP2020/037523
§ 371 (c)(1),
(2) Date: Mar. 28, 2023

(87) PCT Pub. No.: WO2022/070401
PCT Pub. Date: Apr. 7, 2022

(65) Prior Publication Data
US 2023/0353388 A1 Nov. 2, 2023

(51) Int. Cl.
*G06V 20/00* (2022.01)
*B42D 25/328* (2014.01)
(Continued)

(52) U.S. Cl.
CPC .......... *H04L 9/3263* (2013.01); *B42D 25/328* (2014.10); *G06T 7/40* (2013.01); *G06T 7/50* (2017.01); *G06V 10/141* (2022.01)

(58) Field of Classification Search
CPC ....... H04L 9/3263; B42D 25/328; G06T 7/40; G06T 7/50; G06V 10/141; G06V 10/60;
(Continued)

(56) References Cited

U.S. PATENT DOCUMENTS 5,825,911 A * 10/1998 Nishigai .................. G07D 7/10
283/85
6,775,775 B1 * 8/2004 Yoshiura ............ G06Q 20/3672
713/182

(Continued)

FOREIGN PATENT DOCUMENTS

| JP | 2001-322381 A | 11/2001 |
| JP | 2002-056439 A | 2/2002 |

(Continued)

OTHER PUBLICATIONS

International Search Report for PCT Application No. PCT/JP2020/037523, mailed on Dec. 22, 2020.
(Continued)

*Primary Examiner* — Aaron W Carter
(74) *Attorney, Agent, or Firm* — Sughrue Mion, PLLC

(57) ABSTRACT

The information processing device photographs a certificate and determines its authenticity. The information processing device includes a photographing means and a determination means. The photographing means photographs a certificate and generates a photographed image. The determination means determines authenticity of the certificate based on appearance of a surface of the certificate in the photographed image. When the certificate is determined to be true, the image of the certificate is registered with the information processing device.

19 Claims, 15 Drawing Sheets

(51) Int. Cl.
*G06T 7/40* (2017.01)
*G06T 7/50* (2017.01)
*G06V 10/141* (2022.01)
*H04L 9/32* (2006.01)

(58) Field of Classification Search
CPC ........ G06V 20/95; G06V 20/80; G06V 30/00; G07D 7/206
See application file for complete search history.

(56) References Cited

U.S. PATENT DOCUMENTS

| | | | |
|---|---|---|---|
| 2001/0054149 A1* | 12/2001 | Kawaguchi | G07F 7/122 713/176 |
| 2002/0051577 A1* | 5/2002 | Kinjo | G06T 1/0028 382/218 |
| 2002/0131597 A1 | 9/2002 | Hori et al. | |
| 2005/0129281 A1* | 6/2005 | Ashizaki | G06K 19/07716 283/74 |
| 2007/0025714 A1* | 2/2007 | Shiraki | G03B 13/36 348/E5.037 |
| 2007/0071291 A1* | 3/2007 | Yumoto | G06V 40/1335 382/124 |
| 2007/0278422 A1* | 12/2007 | Einhorn | B82Y 20/00 250/462.1 |
| 2010/0034432 A1* | 2/2010 | Ono | G06V 10/141 382/118 |
| 2010/0328687 A1* | 12/2010 | Kimura | H04N 1/32352 358/1.6 |
| 2011/0007191 A1* | 1/2011 | Song | H04N 23/632 348/240.99 |
| 2011/0050916 A1* | 3/2011 | Otsuka | H04N 23/6812 348/E5.031 |
| 2012/0026322 A1* | 2/2012 | Malka | G01C 11/02 348/135 |
| 2012/0269405 A1* | 10/2012 | Kaneda | G06V 40/19 382/118 |
| 2014/0043629 A1* | 2/2014 | Shirado | G06K 15/4095 358/1.14 |
| 2014/0044337 A1 | 2/2014 | Rutz et al. | |
| 2014/0063272 A1* | 3/2014 | Tsuchida | H04N 23/6812 348/208.2 |
| 2014/0168426 A1* | 6/2014 | Andres | G07D 7/205 358/3.06 |
| 2014/0267594 A1* | 9/2014 | Furumura | G03B 37/02 348/36 |
| 2015/0003717 A1 | 1/2015 | Lee et al. | |
| 2015/0154447 A1* | 6/2015 | Wilson | G06T 7/248 382/103 |
| 2016/0048837 A1* | 2/2016 | Jin | G06Q 20/3276 705/76 |
| 2017/0355214 A1* | 12/2017 | Okada | G06V 20/95 |
| 2018/0005027 A1 | 1/2018 | Touret et al. | |
| 2018/0144160 A1* | 5/2018 | Shirakura | G06K 7/10 |
| 2018/0336672 A1* | 11/2018 | Perticone | G06T 7/73 |
| 2019/0012867 A1* | 1/2019 | Okada | B42D 25/328 |
| 2019/0012868 A1* | 1/2019 | Okada | G07D 7/1205 |
| 2019/0384955 A1 | 12/2019 | Frieser et al. | |
| 2023/0334137 A1* | 10/2023 | Hayasaka | G06Q 50/265 |
| 2023/0342900 A1* | 10/2023 | Sasaki | G06T 7/90 |
| 2023/0353388 A1* | 11/2023 | Morishita | G06V 10/60 |
| 2024/0296250 A1* | 9/2024 | Ueno | G06F 21/64 |

FOREIGN PATENT DOCUMENTS

| | | |
|---|---|---|
| JP | 2017-120570 A | 7/2017 |
| JP | 2019-133353 A | 8/2019 |
| KR | 20150071063 A | 6/2015 |

OTHER PUBLICATIONS

Extended European Search Report for EP Application No. 20956329.5, dated on Oct. 26, 2023.

* cited by examiner

INFORMATION PROCESSING DEVICE, INFORMATION PROCESSING METHOD, AND RECORDING MEDIUM

This application is a National Stage Entry of PCT/JP2020/037523 filed on Oct. 2, 2020, the contents of all of which are incorporated herein by reference, in their entirety.

TECHNICAL FIELD

The present invention relates to authenticity determination when a certificate is digitized.

BACKGROUND ART

Recently, public certificates including a face photograph such as a driver's license and a passport are gradually changed from paper media to digital data. With the digitization of the public certificate, it is necessary to confirm that the digitized public certificate is real, i.e., not a counterfeit. Patent Document 1 discloses a technique for recognizing characters, symbols, or the like by OCR process from the image data of a driver's license, and performing authenticity determination of the certificate based on whether or not the recognized characters and symbols conform to a predetermined rule.

PRECEDING TECHNICAL REFERENCES

Patent Document

Patent Document 1: Japanese Patent Application Laid-Open under No. 2017-120570

SUMMARY

Problem to be Solved by the Invention

The technique of Patent Document 1 performs the authenticity determination of the certificate based on the extracted characters and symbols or the like from the image data of the certificate. Therefore, even when a color copy of the certificate or a photographed image of the certificate displayed on another terminal device is used, the authenticity determination results in true if the extracted characters and symbols conform to the predetermined rule.

One object of the present invention is to provide an information processing device capable of determining the authenticity of the certificate even when the information included in the certificate coincide.

MEANS FOR SOLVING THE PROBLEM

According to an example aspect of the present invention, there is provided an information processing device comprising:
a photographing means for photographing a certificate and generating a photographed image; and
a determination means for determining authenticity of the certificate based on appearance of a surface of the certificate in the photographed image.

According to another example aspect of the present invention, there is provided an information processing method comprising:
photographing a certificate and generating a photographed image; and
determining authenticity of the certificate based on appearance of a surface of the certificate in the photographed image.

According to still another example aspect of the present invention, there is provided a recording medium recording a program, the program causing a computer to execute:
photographing a certificate and generating a photographed image; and
determining authenticity of the certificate based on appearance of a surface of the certificate in the photographed image.

EFFECT OF THE INVENTION

According to the present disclosure, even when the information included in the certificate coincide, it is possible to determine the authenticity of the certificate.

EXAMPLE EMBODIMENTS

Preferred example embodiments of the present invention will be described with reference to the accompanying drawings.

Basic Principle

In the following example embodiments, it is assumed that a public certificate of a paper medium such as a driver's license or a passport is photographed by a user using his or her smartphone or tablet terminal (hereinafter, referred to as "terminal device") and is registered in a public certificate application installed in the terminal device or the like.

It is conceivable that a malicious user gets a color copy of another person's public certificate and tries to register it with his own terminal device. Further, as another method, it is considered that a malicious user acquires image data of a public certificate of another person, electronically displays it on a tablet terminal or the like, and tries to register the displayed image with his or her own terminal device by photographing it. In these cases, since the information contained in the acquired color copy or image data is the same as the real certificate, it is not possible to determine the authenticity based on the information obtained from the image data of the certificate.

Therefore, in the following example embodiments, it is determined whether the photographed certificate is true or false based on the appearance of the certificate in the image photographed by the terminal device. That is, the authenticity of the certificate is determined in consideration of the fact that the appearance of the certificate in the photographed image becomes different between the case where a real certificate is photographed by the terminal device used for registration and the case where a color copy or an image displayed on another terminal is photographed.

First Example Embodiment

Next, a terminal device according to the first example embodiment will be described.

Hardware Configuration

Figure 1:
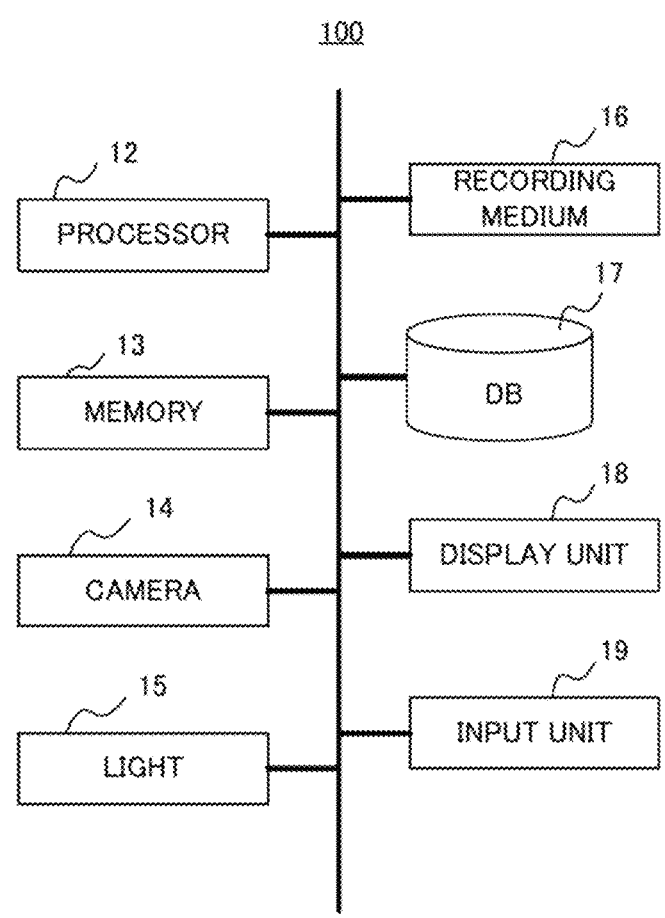
FIG. 1 is a block diagram showing a hardware configuration of a terminal device.

FIG. 1 is a block diagram showing a hardware configuration of the terminal device. The terminal device 100 is a terminal device of a user and includes a processor 12, a memory 13, a camera 14, a light 15, a recording medium 16, a database (DB) 17, a display unit 18, and an input unit 19.

The processor 12 is a computer such as a CPU (Central Processing Unit) or a GPU (Graphics Processing Unit) and controls the entire terminal device 100 by executing a program prepared in advance. In particular, the processor 12 performs certificate digitization processing to be described later.

The memory 13 may be a ROM (Read Only Memory) and a RAM (Random Access Memory). The memory 13 stores various programs executed by the processor 12. The memory 13 is also used as a working memory during various processing performed by the processor 12.

The camera 14 is provided in the terminal device, and generates a photographed image of the certificate to be digitized. The light 15 is a flashlight or the like provided in the terminal device, and is used to illuminate the certificate at the time of photographing.

The recording medium 16 is a non-volatile and non-transitory recording medium such as a disk-like recording medium and a semiconductor memory and is configured to be detachable from the terminal device 100. The recording medium 16 records various programs to be executed by the processor 12.

The DB 17 stores the photographed image of the certificate generated by the camera 14. Further, the digital data of the certificate determined to be authentic by the terminal device 100 is stored in the DB 17. The display unit 18 is a liquid crystal panel or the like provided in the terminal device, and displays the image of the certificate photographed by the camera 14 and an operation screen for registering the certificate with the terminal device. The input unit 19 is a button provided in the terminal device or a touch panel integrated with the display unit 18. Necessary instructions and inputs are made by the user to the input unit 19 at the time of executing the certificate digitization processing.

Functional Configuration

Figure 2:
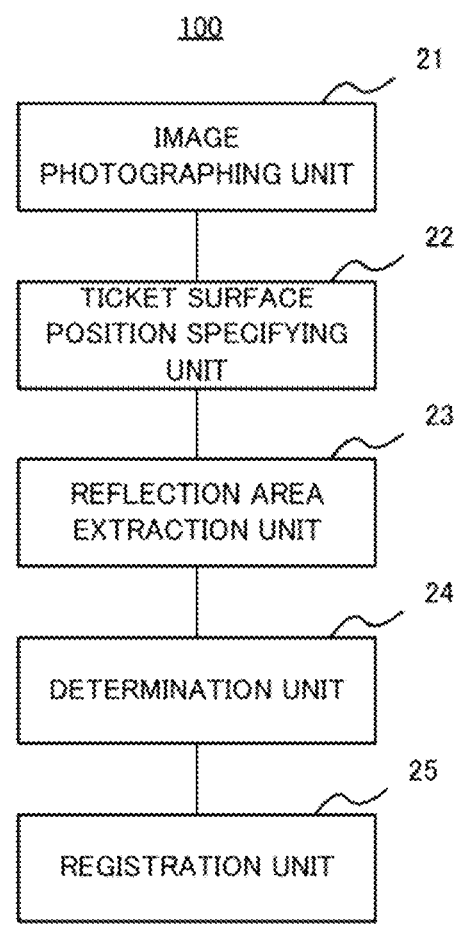
FIG. 2 is a block diagram showing a functional configuration of a terminal device according to a first example embodiment.

FIG. 2 is a block diagram showing a functional configuration of the terminal device 100 according to the first example embodiment. The terminal device 100 functionally includes an image photographing unit 21, a ticket surface position specifying unit 22, a reflection area extraction unit 23, a determination unit 24, and a registration unit 25.

Figure 3A:
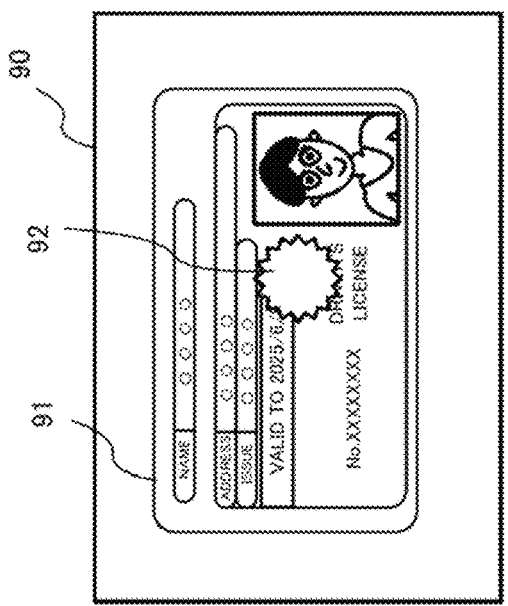
FIGS. 3A to 3D show examples of a photographed image.

The image photographing unit 21 controls the camera 14 and the light 15 on the basis of an instruction of a user to photograph a certificate. In the first example embodiment, it is assumed that the image photographing unit 21 drives the light 15 and photographs the certificate in a state that an illumination light is irradiated on the certificate. FIG. 3A shows an example of a photographed image. The photographed image 90 includes a ticket surface 91 of the certificate in part. Although details will be described later, the photographed image 90 shown in FIG. 3A is an image photographed in a state irradiated with the illumination light, and the reflected light 92 of the illumination light is captured. The image photographing unit 21 outputs the photographed image 90 to the ticket surface position specifying unit 22.

Figure 3B:
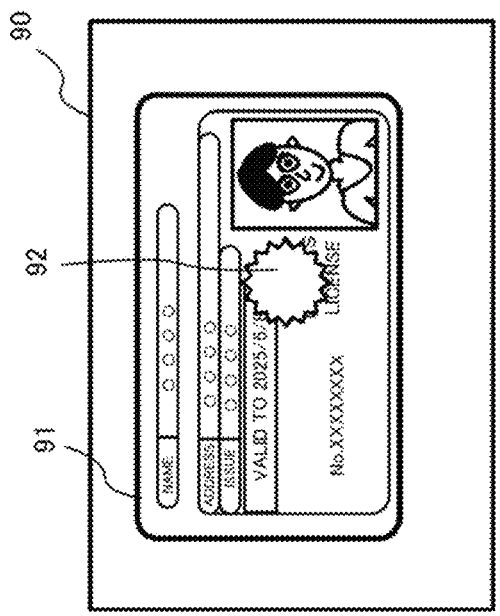

The ticket surface position specifying unit 22 specifies the position of the ticket surface of the certificate from the photographed image 90 of the certificate. The "ticket surface" is a front surface or a back surface of the certificate. The ticket surface position specifying unit 22 performs an image recognition process on the photographed image 90, and extracts the position of the ticket surface 91 of the certificate from the photographed image 90 as shown in FIG. 3B. Specifically, the ticket surface position specifying unit 22 specifies the position of the ticket surface 91 of the certificate using template matching or a local feature value (such as a Scale-Invariant Feature Transform algorithm). For example, as a preprocessing, a template of the certificate is prepared in advance, and the local feature values are extracted from the template. Next, among the extracted local feature values, regions where information is not fixed in the ticket surface of the certificate, such as name, address, and ticket surface photograph, are excluded. That is, the local feature values of the region common to all persons in the certificate are prepared as the local feature values of the template. In an actual processing, the ticket surface position specifying unit 22 extracts the local feature values from the photographed image 90, checks them with the local feature values of the template, and specifies the position of the ticket surface 91 in the photographed image 90. At this time, since the local feature values such as the name and the face photograph are excluded from the local feature values of the template, the ticket surface position specifying unit 22 can accurately specify the position of the ticket surface 91. The ticket surface position specifying unit 22 outputs the position of the ticket surface 91 to the reflection area extraction unit 23.

Figure 3C:
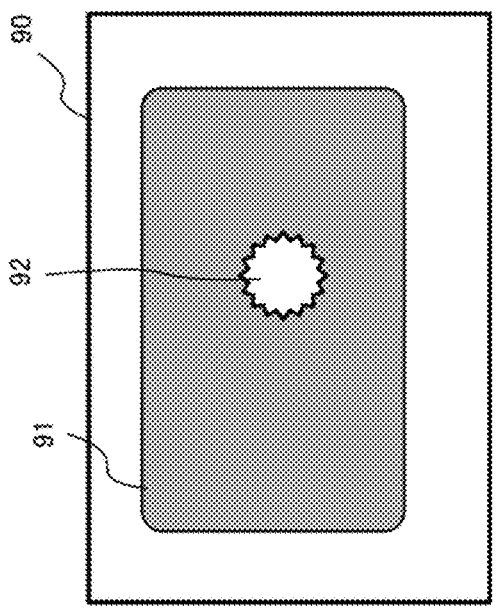

The reflection area extraction unit 23 extracts the reflected light 92 present in the range of the ticket surface 91. Specifically, as shown in FIG. 3C, the reflection area extraction unit 23 binarizes the image of the area of the ticket surface 91 by a predetermined threshold value, and determines the area where the luminance value is equal to or larger than the threshold value as the reflected light 92.

Figure 3D:
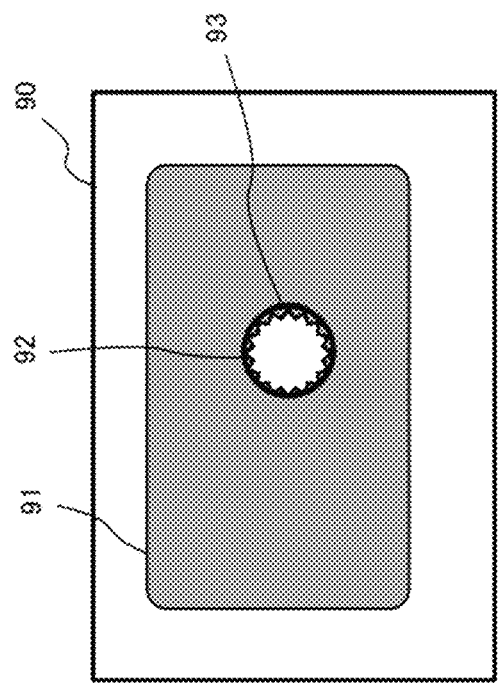

Then, the reflection area extraction unit 23 approximate the region of the reflected light 92, i.e., the area where the luminance is equal to or larger than the threshold value, by a circle or ellipse as shown in FIG. 3D, and extracts the area as the reflection area 93. The reflection area extraction unit 23 can extract the contour of the reflected light 92 by using a method of image processing such as contour extraction and circumscribed rectangle extraction. The reflection area extraction unit 23 outputs the extracted reflection area 93 to the determination unit 24. Incidentally, since the reflection area extraction unit 23 extracts the reflection area 93 within the area of the ticket surface 91, it is possible to exclude the reflected light from the outside of the area of the ticket surface 91 in the photographed image, e.g., the reflected light generated by the desk or the like on which a certificate is placed at the time of photographing.

The determination unit 24 determines the authenticity of the photographed certificate based on the appearance of the reflected light 92 included in the photographed image, and outputs the determination result to the registration unit 25. Specifically, the determination unit 24 determines the authenticity of the certificate by one of the following methods.

(Method 1-1) Method Using Intensity of the Reflected Light

Figure 4A:
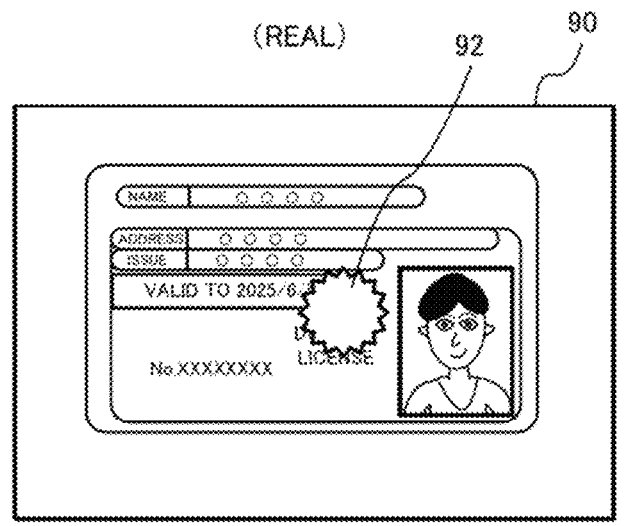
FIGS. 4A to 4C show examples of a photographed image.
Figure 4B:
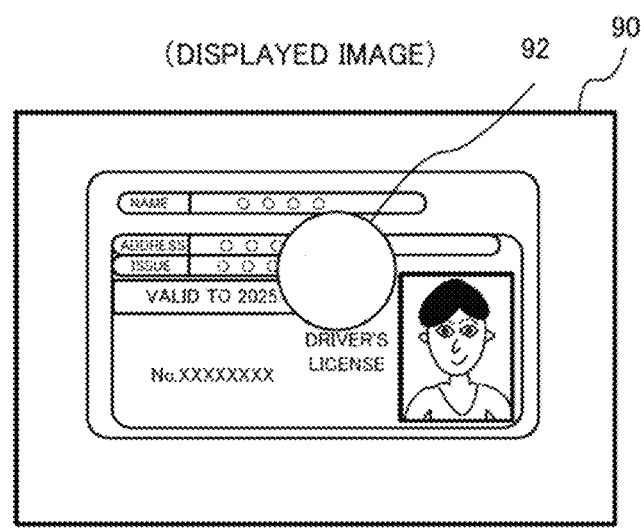
Figure 4C:
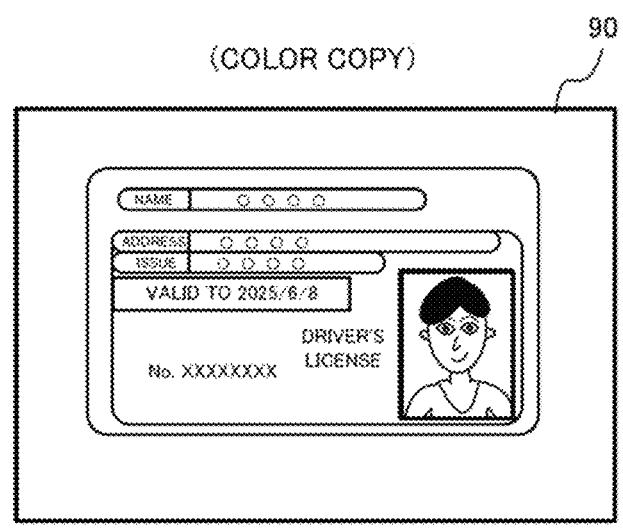

The determination unit 24 determines the authenticity of the certificate by comparing the average of the luminance values of the pixels in the reflection area 93 with a predetermined threshold value. FIGS. 4A to 4C show the relationship between the photographed image of the certificate taken with the illumination light, and the reflected light. FIG. 4A shows the photographed image of a real driver's license, FIG. 4B shows the photographed image of a driver's license displayed on a tablet or the like, and FIG. 4C shows the photographed image of a color copy of a driver's license. Since the real driver's license is glossy to some extent on the ticket surface, the reflected light 92 of the illumination light appears in the photographed image as shown in FIG. 4A. Since a display surface of a tablet or the like is smooth and highly reflective, when the photographed image of the driver's license is displayed on a tablet or the like, the reflected light 92 is more reflected and brighter than that in the case of the real certificate, as shown in FIG. 4B. On the other hand, although depending on the paper to be used, since the ticket surface of the general paper is rough and less reflective, the reflected light does not appear or becomes considerably small even if it appears in the photographed image of the color copy, as shown in FIG. 4C.

The determination unit 24 calculates the average luminance value I in the reflection area 93 and compares it with a predetermined threshold $Th_{11}$ and $Th_{12}$. By preliminary experimentation and the like, the thresholds $Th_{11}$ and $Th_{12}$ are predetermined such that the average luminance I of the real certificate satisfies the relation $Th_{11}<I<Th_{12}$. The determination unit 24 determines that the photographed certificate is true when the average luminance value I calculated from the photographed images satisfies the relation $Th_{11}<I<Th_{12}$. When the average luminance value I satisfies $I \leq Th_{11}$, the determination unit 24 determines that the photographed certificate is a false one such as a color copy, because the reflected light is too dark. Further, when the average luminance value I satisfies $I \geq Th_{12}$, the determination unit 24 determines that the photographed certificate is a false one such as an image displayed on a tablet or the like, because the reflected light is too bright. Thus, the determination unit 24 can determine the authenticity of the certificate using the intensity of the reflected light. While the determination unit 24 uses the average luminance value I of the pixels in the reflection area 93 in the above example, the determination unit 24 may use other statistical value such as a maximum value, a minimum value, and a median instead. When using other statistical value, the thresholds $Th_{11}$ and $Th_{12}$ may be adjusted accordingly.

(Method 1-2) Method Using the Area of the Reflection Area

The determination unit 24 can perform the authenticity determination of the certificate using the area of the reflection area 93. As described with reference to FIG. 4, as compared to the reflection area 93 of the real certificate, the reflection area 93 of the certificate image displayed on a tablet or the like is large, and the reflection area 93 of the color copy of the certificate is small. Therefore, by preliminary experimentation or the like, the thresholds $Th_{41}$ and $Th_{42}$ are predetermined such that the area S of the reflective area 93 of the real certificate satisfies the relation $Th_{41}<S<Th_{42}$. At the time of actual determination, when the area S of the reflection area 93 calculated from the photographed images satisfies the relation $Th_{41}<S<Th_{42}$, the determination unit 24 determines that the photographed certificate is true. When the area S of the reflection area 93 satisfies the relation $S \leq Th_{41}$, the determination unit 14 determines that the photographed certificate is a false one such as a color copy. Further, when the area S of the reflective area 93 satisfies the relation $S \geq Th_{42}$, the determination unit 24 determines that the photographed certificate is a false one such as an image displayed on a tablet or the like. Thus, the determination unit 24 can determine the authenticity of the certificate using the area of the reflection area 93.

(Method 1-3) Method Using Shape, Texture, or the Like of Reflected Light

The shape and texture of the reflected light extracted are different between the case where the certificate is real and the case where the certificate is an image displayed on a tablet or the like. When the photographed certificate is a real certificate, the reflected light 92 tends to have jags or luminance variation on its outer periphery as shown in FIG. 4A. In contrast, when the photographed certificate is an image displayed on the tablet, the reflected light 92 has less jags or luminance variation at its outer periphery, and an outer shape of the reflected light 92 is close to a circle or ellipse as shown in FIG. 4B. Therefore, the determination unit 24 can determine the authenticity of the certificate based on the shape and texture of the reflected light 92.

(Method 1-4) Method Using the Position of Reflected Light

The outer shape of the ticket surface 91 in the photographed image varies depending on the inclination of the photographing direction of the camera 14 with respect to the certificate. When photographed by the camera 14 from a direction directly facing the ticket surface 91 of the certificate, the outer shape of the ticket surface 91 is rectangular. On the other hand, when photographed by the camera 14 from a three-dimensionally oblique direction with respect to the ticket surface 91 of the certificate, the outer shape of the ticket surface 91 in the photographed image becomes a distorted shape such as a trapezoid or a diamond. Therefore, based on the outer shape of the ticket surface 91 in the photographed image, it is possible to calculate the three-dimensional inclination of the photographing direction of the camera 14 with respect to the certificate. Further, since the camera 14 and the light 15 are respectively provided at a fixed position in the terminal device such as a smartphone, the three-dimensional positional relationship between the photographing direction by the camera 14 and the direction of the illumination light by the light 15 is known for each smartphone. Therefore, the three-dimensional positional relationship between the photographing direction by the camera 14 and the direction of the illumination light by the light 15 are stored in advance in association with the type of the smartphone, for example.

Based on the positional relationship between the photographing direction of the camera 14 with respect to the certificate and the direction of the illumination light by the light 15, the determination unit 24 predicts the position in the ticket surface 91 of the certificate where the reflected light 92 appears when a real certificate is photographed by the camera 14, and can calculate the range where the reflected light 92 is predicted to appear (hereinafter, referred to as "prediction range".). Then, the determination unit 24 determines that the photographed certificate is true when the position of the reflected light 92 in the photographed image belongs to the above-described prediction range, and determines that the photographed certificate is false when the position of the reflected light 92 in the photographed image does not belong to the prediction range. Thus, the determination unit 24 can determine that the certificate is false, if the reflected light 92 exists in such a position that cannot occur when a real certificate is actually photographed.

(Method 1-5) Combination of the Above Methods

The determination unit 24 may use a combination of two or more of the above-described methods 1-1 to 1-4 to determine the authenticity of the certificate. In this case, the determination unit 24 may determine the authenticity of the certificate by two or more of the above-described methods 1-1 to 1-4 and may determine a final determination result by integrating those determination results. For example, when the determination results by all the methods coincide, the determination unit 24 may use the result as a final determination result. The determination unit 24 may determine the final determination result by majority decision of the determination results by plural methods.

(Method 1-6) Method Using Plural Photographed Images

If the image photographing unit 21 generates a plurality of photographed images by photographing the certificate from different directions, the determination unit 24 can determine the authenticity of the certificate using the plurality of photographed images. In this case, the determination unit 24 may determine the authenticity of the certificate by any one of the above-described methods 1-1 to 1-4 for each photographed image, and determine a final determination result by integrating the determination results. For example, when the determination results of two photographed images indicate that both are true, the determination unit 24 may determine the certificate to be true. The determination unit 24 may determine the final determination result by majority decision of the determination results of the plurality of photographed images. The image photographing unit 21 may capture a video of the certificate while changing the direction of the camera 14 with respect to the certificate, and extract a plurality of frame images from the video as the plural photographed images.

Further, in the case of using a plurality of photographed images, one image may be photographed with an illumination light, and another image may be photographed without an illumination light or with an illumination light having a luminance value smaller than the one image. In this case, the determination unit 24 determines whether or not the intensity of the reflected light changes between the case with the illumination light and the case without the illumination light, or between the case with the illumination light and the case with the illumination light having a smaller luminance value. If there is no large difference in the intensity of the reflected light between the case with the illumination light and the case without the illumination light, or between the case with the illumination light and the case with the illumination light having a smaller luminance value, or if the reflected light is captured even though the image was photographed without the illumination light, the determination unit 24 may determine that the certificate is false because there is a possibility that it is not actually photographed.

Furthermore, when plural photographed images are used, the determination unit 24 may determine whether or not the certificate exists within the imaging range of the camera 14 during the photographing. If a part or the whole of the certificate does not exist in the imaging range during the photographing, the determination unit 24 may determine the certificate to be false because there is a possibility that plural certificate images are prepared and replaced.

Returning to FIG. 2, the registration unit 25 registers the photographed image of the certificate that is determined to be true by the determination unit 24 with the DB 17. Thus, the digital data of the certificate determined to be true is registered with the terminal device 100. Instead of registering the photographed image of the certificate that is determined to be true with the DB 17, the registration unit 25 may extract information related to the user from the photographed image and register the extracted information with the DB 17. For example, when the certificate is a driver's license, the registration unit 25 may extract information unique to the user, such as a name, an address, an expiration date, a driver's license number, and a face image, from the photographed image and register the information with the DB 17. In this instance, when displaying the information of the registered certificate on the display unit 18, the terminal device 100 may read out the registered information from the DB 17 and insert them into the corresponding portions in the template of the driver's license to generate and display an image of a pseudo driver's license.

Certificate Digitization Processing

Figure 5:
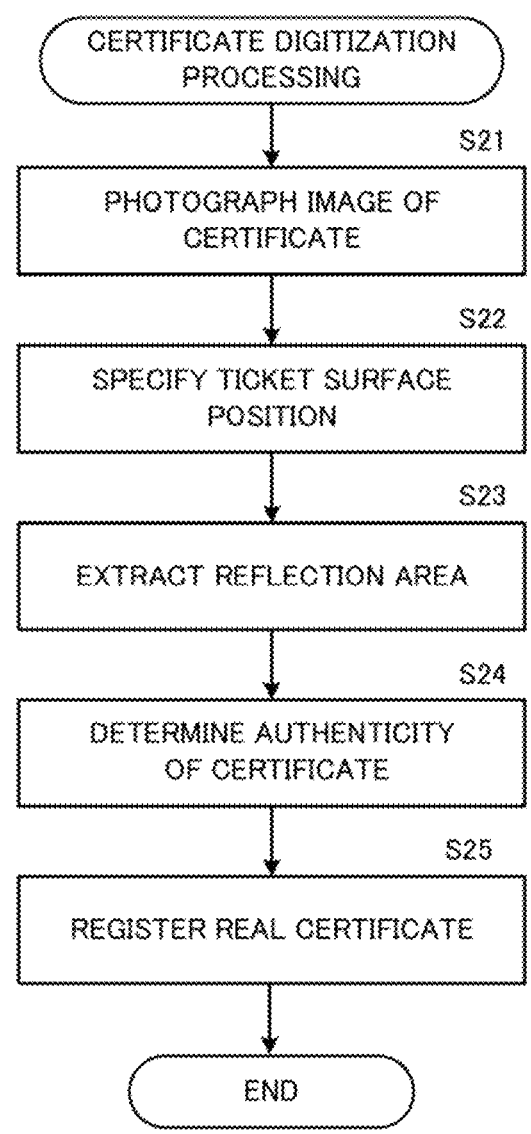
FIG. 5 is a flowchart of certificate digitization processing according to the first example embodiment.

FIG. 5 is a flowchart of certificate digitization processing by the terminal device 100 of the first example embodiment. This processing is realized by the processor 12 shown in FIG. 1, which executes a program prepared in advance and operates as each element shown in FIG. 2.

First, the image photographing unit 21 photographs a certificate by controlling the camera 14 and the light 15 on the basis of a user's photographing instruction, and generates a photographed image (step S21). Next, the ticket surface position specifying unit 22 performs an image recognition process on the photographed image of the certificate, and specifies the position of the ticket surface 91 of the certificate (step S22). Next, the reflection area extraction unit 23 extracts the reflection area within the area of the ticket surface 91 of the certificate based on the luminance value of the photographed image (step S23).

Next, the determination unit 24 determines the authenticity of the photographed certificate based on the reflection area by any of the methods 1-1 to 1-6 described above (step S24). Then, the registration unit 25 registers the photographed image of the certificate determined to be true by the determination unit 24 with the DB 17 (step S25). Then, the certificate digitization processing ends.

Modified Examples

Next, description will be given of modified examples of the first example embodiment. The following modified examples can be applied in appropriate combination.

Modified Example 1-1

In the above-described example embodiment, the registration unit 25 registers the image of the certificate determined to be true with the DB 17 as the digital certificate. At this time, the registration unit 25 may performs image processing on the photographed image, and register the image with the DB 17 after correcting the image of the certificate to the image as photographed from the front. As described in Method 1-4, the determination unit 24 can calculate the three-dimensional inclination of the photographing direction of the camera 14 with respect to the certificate based on the outer shape of the ticket surface 91 in the photographed image. Usually, when the user photographs a certificate by the terminal device 100, it is difficult to photograph by directly facing the camera 14 with respect to the certificate, and the photographed image often becomes an image photographed from the oblique direction. Therefore, when registering with the DB 17, the registration unit 25 corrects the photographed image so that the outer shape of the ticket surface 91 becomes a rectangle and registers the corrected image with the DB 17. Thus, when the registered image is used as a digital certificate thereafter, it is possible to display an image of distortion-free rectangular certificate.

Modified Example 1-2

When the user photographs an image of the certificate with the camera 14 of the terminal device 100, the guide information may be presented so that the user can easily operate. Since the reflected light may not appear in the photographed image depending on the angle of the camera 14 with respect to the certificate, it is necessary to tilt the terminal device 100 at an appropriate angle with respect to the certificate at the time of photographing. Therefore, the terminal device 100 calculates the three-dimensional inclination of the photographing direction of the camera 14 with respect to the certificate based on the outer shape of the ticket surface 91 in the photographed image as described above, and outputs the guide information so as to guide the angle of the camera 14 to the appropriate angle. For example, the terminal device 100 may display an arrow or the like indicating the direction to tilt the camera 14 on the display unit 18. The terminal device 100 may display a message such as "Tilt slightly to the right" on the display unit 18 or output the message by voice.

Modified Example 1-3

When a smartphone or the like is used as the terminal device 100, information of the acceleration sensor may be used. By using the output of the acceleration sensor, it is possible to determine whether or not the user is actually photographing. For example, it is assumed that the certificate is placed on a horizontal desk or the like and photographed from above. As described above, the terminal device 100 can calculate the three-dimensional inclination of the photographing direction of the camera 14 with respect to the certificate based on the outer shape of the ticket surface 91 in the photographed image. On the other hand, it is possible to detect the inclination of the terminal device from the output of the acceleration sensor of the terminal device 100. Therefore, the terminal device 100 compares the inclination of the terminal device calculated from the photographed image with the inclination of the terminal device calculated from the output of the acceleration sensor. When they are not within a predetermined range, the terminal device 100 may judge that there is a possibility that the photographing is not actually performed, and may determine the certificate to be false or cancel the digitization processing itself.

Instead of assuming that the certificate is placed in a horizontal position, the certificate may be photographed from two different direction. In this case, the terminal device 100 calculates the inclination of the terminal device with respect to the certificate from each of the first photographed image and the second photographed image, and calculates the difference. Further, the terminal device 100 calculates the inclination of the terminal device from the output of the acceleration sensor at the time of photographing the first photographed image and the second photographed image, and calculates the difference. Then, the terminal device 100 compares the difference in the inclination of the terminal device calculated from the photographed image with the difference in the inclination of the terminal device calculated from the output of the acceleration sensor. When they are not within a predetermined range, the terminal device 100 may judge that there is a possibility that the photographing is not actually performed, and may determine the certificate to be false or cancel the digitization processing itself.

Second Example Embodiment

Next, description will be given of a terminal device according to the second example embodiment. In the second example embodiment, the authenticity of the certificate is determined based on the appearance of the hologram pattern provided in the certificate. In the following description, an example of a hologram pattern will be described. However, it is possible to apply the second example embodiment similarly to an optical pattern using a technique other than hologram.

Hardware Configuration

The hardware configuration of the terminal device according to the second example embodiment is the same as the first example embodiment shown in FIG. 1. Therefore, the description thereof will be omitted.

Functional Configuration

Figure 6:
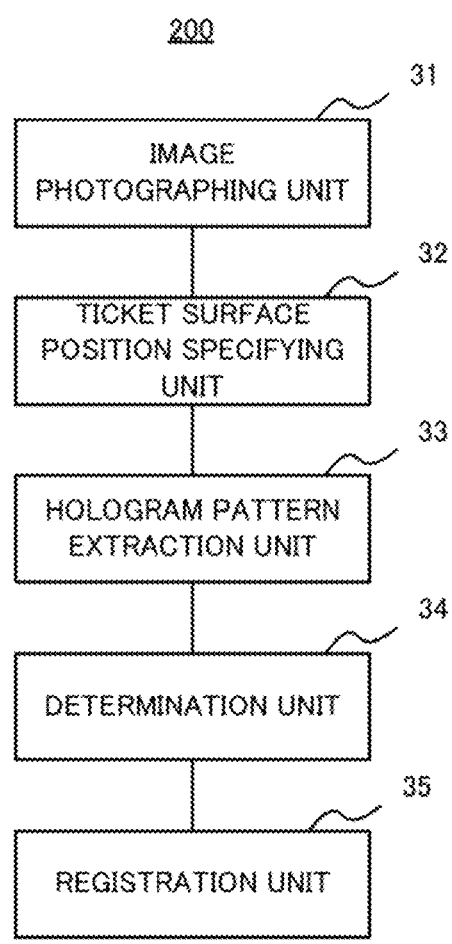
FIG. 6 is a block diagram showing a functional configuration of a terminal device according to a second example embodiment.

FIG. 6 is a block diagram showing a functional configuration of a terminal device 200 according to the second example embodiment. The terminal device 200 includes an image photographing unit 31, a ticket surface position specifying unit 32, a hologram pattern extraction unit 33, a determination unit 34, and a registration unit 35. Since the image photographing unit 31, the ticket surface position specifying unit 32, and the registration unit 35 are basically the same as the image photographing unit 21, the ticket surface position specifying unit 22, and the registration unit 25 of the first example embodiment, the description thereof will not be repeated.

Figure 7:
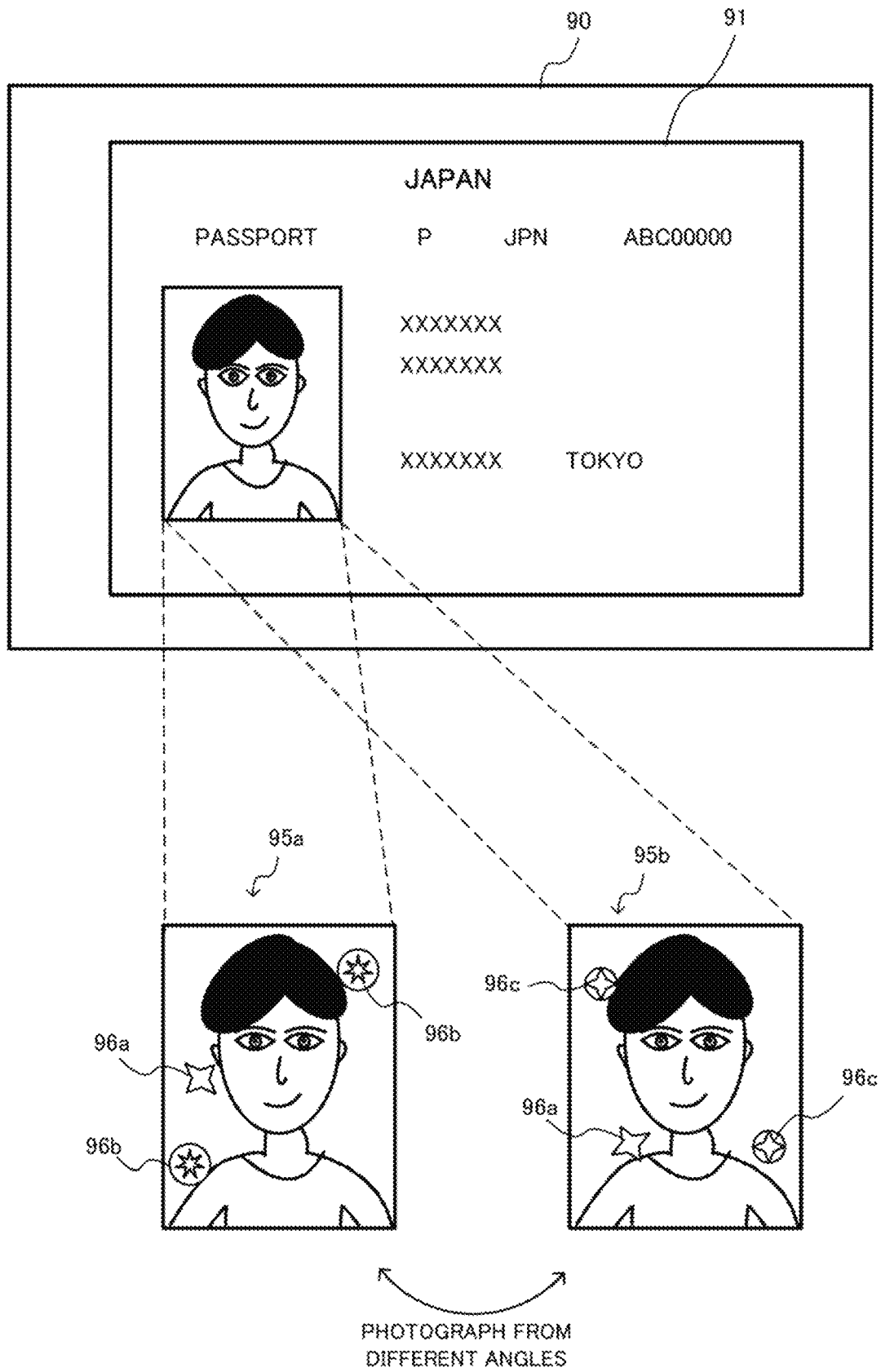
FIG. 7 schematically shows examples of a hologram pattern.

The hologram pattern extraction unit 33 extracts hologram patterns existing in the range of the ticket surface 91 in the photographed image 90 of the certificate. FIG. 7 schematically shows an example of the hologram patterns. Hologram patterns are formed on a certificate such as a passport. Usually, the hologram pattern is formed so that the position, the pattern (shape), and the color are different depending on the angle that the user sees. In the example of FIG. 7, when the user views from a certain angle, one hologram pattern 96a and two hologram patterns 96b are visible as shown in the face image 95a. Also, when the user views from another angle, one hologram pattern 96a and two hologram patterns 96c are visible as shown in the face image 95b. The hologram pattern extraction unit 33 extracts the hologram patterns appearing in the photographed image 90 of the certificate generated by the certificate image photographing unit 31, and outputs them to the determination unit 34.

The determination unit 34 determines the authenticity of the photographed certificate based on the appearance of the hologram patterns on the ticket surface of the certificate, and outputs the determination result to the registration unit 35. Specifically, the determination unit 34 determines the authenticity of the certificate by the following methods.

(Method 2-1) Method Using Presence or Absence of the Hologram Pattern

The determination unit 34 can determine the authenticity of the certificate based on the presence or absence of the hologram pattern. Since the hologram pattern is present in the real certificate, the determination unit 34 can determine the certificate to be false if there is no hologram pattern on the ticket surface 91 of the photographed image.

(Method 2-2) Method Using the Type of the Hologram Pattern

In some cases, the hologram pattern to be used is determined in advance depending on the certificate. In this case, the determination unit 34 can determine the authenticity of the certificate based on whether or not the hologram patterns extracted from the photographed image coincide with the hologram patterns determined in advance. For example, it is assumed that three hologram patterns 96a to 96c illustrated in FIG. 7 are used in a certain certificate. In this case, the determination unit 34 can determine the certificate to be false if the hologram pattern other than the hologram patterns 96a to 96c is included in the photographed image 90.

In addition, there may be a case where a plurality of hologram patterns that must be used in the certificate is determined in advance. For example, it is assumed that each of the three hologram patterns 96a to 96c illustrated in FIG. 7 must be used in a certain certificate. In this case, the determination unit 34 determines the certificate to be true when the hologram patterns extracted from the photographed image includes all three hologram patterns 96a to 96c, and determines the certificate to be false when at least one of the three patterns 96a to 96c is missing.

In addition, there may a case where the type and position of the hologram pattern used in the certificate are determined in advance. For example, it is predetermined as a rule that the hologram pattern 96a illustrated in FIG. 7 is provided on the left side of the face in the face image and the hologram pattern 96b is provided on the right side of the face. In this case, the determination unit 34 determines the certificate to be true when the hologram patterns extracted from the photographed image match the above rule, and determines the certificate to be false when the hologram patterns do not match the above rule.

Incidentally, the determination unit 34 can determine whether or not the type of the hologram is consistent by calculating the degree of coincidence between the feature values using the above-described local feature value (SIFT, etc.), for example. Further, when the type of the hologram pattern, the number of hologram patterns to be used, or the position where the hologram pattern is provided is predetermined as a rule as described above, the information indicating the rule may be stored as hologram pattern information in the DB 17 shown in FIG. 1.

(Method 2-3) Method Using the Position of the Hologram Pattern

Like the method 1-4 in the first example embodiment (method using the position of the reflected light), the determination unit 34 may determine the authenticity of the certificate based on whether the hologram pattern exists within a predetermined range of the ticket surface 91. Specifically, the determination unit 24 can predict the position in the ticket surface 91 of the certificate where the hologram patter 96 appears, based on the photographing direction of the camera 14 with respect to the certificate, when the camera 14 is photographing a real certificate, and calculate the predicted range in which the hologram pattern 96 is predicted to appear. Then, the determination unit 24 determines the photographed certificate to be true when the position of the hologram pattern 96 in the actual photographed image belongs to the above predicted range, and determines the photographed certificate to be false when the position of the hologram pattern 96 does not belong to the predicted range.

(Method 2-4) Combination of the Above Methods

The determination unit 34 may use a combination of two or more of the above-described methods 2-1 to 2-3 to determine the authenticity of the certificate. In this case, the determination unit 34 determines the authenticity of the certificate by two or more of the above-described methods 2-1 to 2-3, and determine a final determination result by integrating those determination results. In this case, when the determination results by all methods coincide, the determination unit 34 may use it as a final determination result. The determination unit 34 may determine the final determination result by majority decision of the determination results by a plurality of methods.

(Method 2-5) Using Multiple Photographed Images

When the image photographing unit 31 generates a plurality of photographed images by photographing the certificate from different directions, the determination unit 34 can determine the authenticity of the certificate using a plurality of photographed images. In this case, the determination unit 34 may determine the authenticity of the certificate by any one of the above-described methods 2-1 to 2-3 for each photographed image, and determine a final determination result by integrating the plural determination results. For example, when the determination results of two photographed images indicates that both are true, the determination unit 34 may determine the certificate to be true. The determination unit 34 may determine the final determination result by majority decision of the determination results of the plurality of photographed images.

The image photographing unit 31 may shoot a video of the certificate while changing the direction of the camera 14 relative to the certificate and extract a plurality of frame images of the video as the photographed images. When using a hologram pattern, there is such a characteristic that the type, the position, the color or the like of the hologram pattern change in accordance with the angle of viewing the certificate as described above. Therefore, it is particularly effective to perform determination using a plurality of photographed images taken from different angles.

Certificate Digitization Processing

Figure 8:
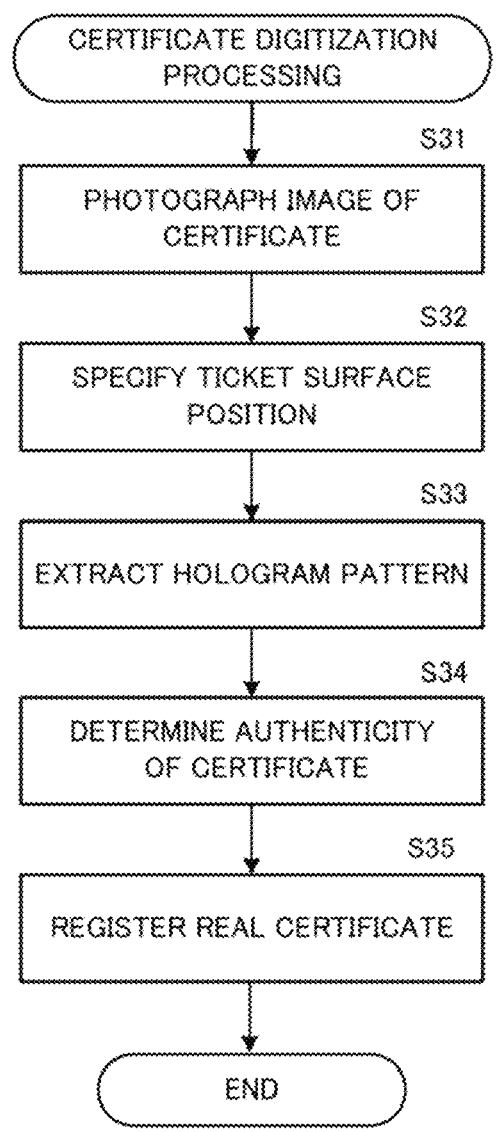
FIG. 8 is a flowchart of certificate digitization processing according to the second example embodiment.

FIG. 8 is a flowchart of certificate digitization processing by the terminal device 200 of the second example embodiment. This processing is realized by the processor 12 shown in FIG. 1, which executes a program prepared in advance and operates as the elements shown in FIG. 2.

First, the image photographing unit 31 controls the camera 14 to photograph a certificate based on the user's photographing instruction, and generates a photographed image (step S31). Next, the ticket surface position specifying unit 32 performs an image recognition process on the photographed image of the certificate, and specifies the position of the ticket surface 91 of the certificate (step S32). Next, the hologram pattern extraction unit 33 extracts a hologram pattern using a local feature value or the like in the area of the ticket surface 91 of the certificate (step S33).

Next, the determination unit 34 determines the authenticity of the photographed certificate based on the extracted hologram pattern by any of the methods 2-1 to 2-5 described above (step S34). Then, the registration unit 35 registers the photographed image of the certificate, which is determined to be true by the determination unit 34, with the DB 17 (step S35). Then, the certificate digitization processing ends.

Modified Examples

Next, description will be given of modified examples of the second example embodiment. The following modified examples can be applied in appropriate combination.

Modified Example 2-1

Similarly to the modified example 1-1 of the first example embodiment, when registering the image of the certificate determined to be true with the DB 17 as a digital certificate, the registration unit 35 may perform image processing on the photographed image to correct the image of the certificate to the image as photographed from a direction directly facing the certificate, and register the image of the certificate thus corrected with the DB 17. In the second example embodiment, the photographing may be performed by intentionally tilting the camera 14 to extract the hologram pattern, and the photographed image in that case becomes a photographed image from the oblique direction. Therefore, when registering the photographed image with the DB 17, the registration unit 35 corrects the photographed image so that the outer shape of the ticket surface 91 becomes a rectangle and registers the photographed image with the DB 17. Thus, when the registered certificate image is used as a digital certificate thereafter, it is possible to display an image of distortion-free rectangular certificate.

Modified Example 2-2

Similarly to the modified example 1-2 of the first example embodiment, when the user photographs an image of the certificate with the camera 14 of the terminal device 200, the guide information may be presented so that the user can easily operate. Since the hologram pattern may not appear in the photographed image depending on the angle of the camera 14 with respect to the certificate, it is necessary to tilt the terminal device 200 at an appropriate angle with respect to the certificate at the time of photographing. Therefore, as described above, the terminal device 200 calculates the three-dimensional inclination of the photographing direction of the camera 14 with respect to the certificate based on the outer shape of the ticket surface 91 in the photographed image, and outputs the guide information so as to guide the angle of the camera 14 to the appropriate angle. For example, the terminal device 200 may display an arrow or the like indicating a direction to tilt the camera 14 on the display unit 18. The terminal device 200 may display a message such as "Tilt slightly to the right" on the display unit 18 or output the message by voice. According to this method, when a hologram pattern is provided so as to be visible when viewed from a specific angle with respect to the certificate, for example, the user can be guided to photograph from that specific angle.

Modified Example 2-3

The method of the modified example 1-3 of the first example embodiment may be applied to the second example embodiment. That is, when a smartphone or the like is used as the terminal device 200, the information of the acceleration sensor is used. By using the output of the acceleration sensor, it is possible to determine whether or not the user is actually photographing an image.

Modified Example 2-4

The method of using the reflected light of the first example embodiment and the method of using the hologram pattern of the second example embodiment may be implemented in combination. In this case, the terminal device photographs the certificate in a state irradiated with the illumination light using the light 15, and the reflected light and the hologram pattern included in the photographed image may be used to determine the authenticity of the certificate.

Third Example Embodiment

Figure 9:
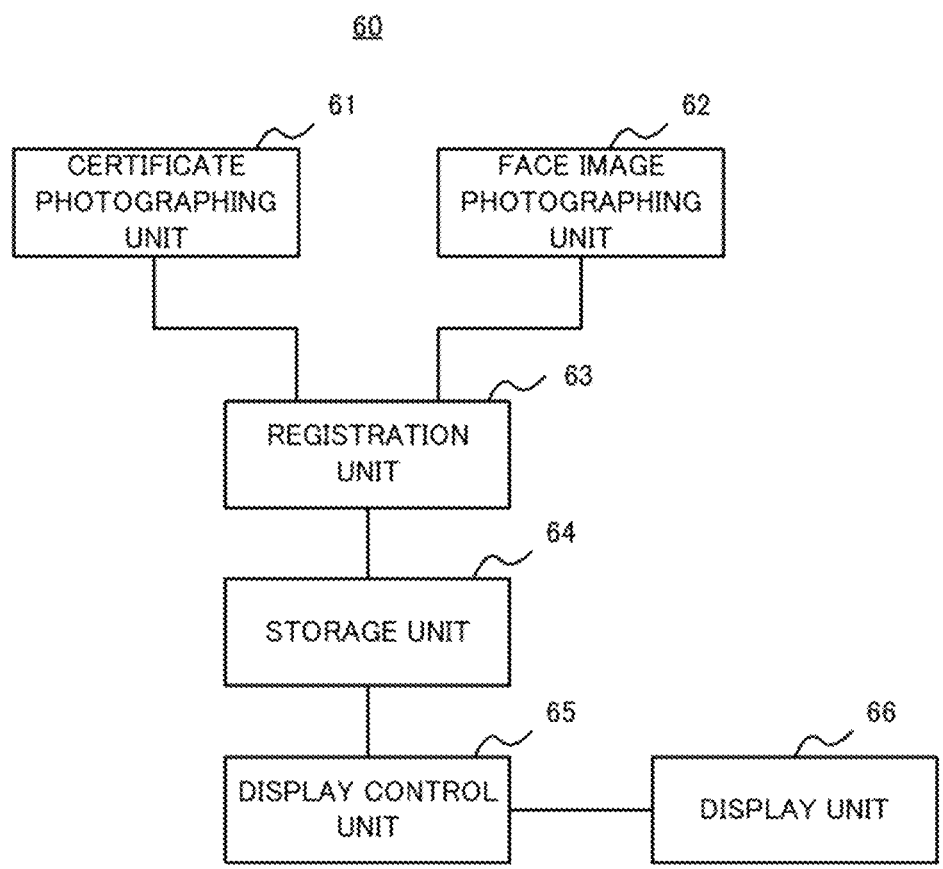
FIG. 9 shows a configuration of a terminal device according to a third example embodiment.

Next, a third example embodiment will be described. In the third example embodiment, the terminal device according to the present disclosure is applied to the registration of a driver's license. In this example embodiment, the face authentication of a person who performs a registration operation (hereinafter referred to "operator") is also performed when the certificate is registered. FIG. 9 shows a configuration of a terminal device 60 according to the third example embodiment. The terminal device 60 basically has the same hardware configuration as the first example embodiment shown in FIG. 1.

Configuration

The terminal device 60 includes a certificate photographing unit 61, a face image photographing unit 62, a registration unit 63, a storage unit 64, a display control unit 65, and a display unit 66. The certificate photographing unit 61 photographs a driver's license which is a certificate by a camera or the like. The certificate photographing unit 61 outputs the certificate image generated by the photographing to the registration unit 63. The face image photographing unit 62 photographs the face image of the operator performing the registration operation of the certificate by a camera or the like, and outputs the face image to the registration unit 63.

The registration unit 63 determines the authenticity of the certificate by the method of the first or second example embodiment using the certificate image generated by the certificate photographing unit 61. Further, the registration unit 63 acquires the face image from the certificate image, and collates it with the face image generated by the face image photographing unit 62 to determine whether or not the operator is the owner of the certificate. Then, the registration unit 63 registers the certificate image with the storage unit 64 when it determines that there is no falsification of the certificate based on the certificate image and that the operator is the same person as the owner of the certificate based on the face image.

After the certificate image is registered with the storage unit 64, the display control unit 65 displays the certificate image registered with the storage unit 64 on the display unit 66 in accordance with the user's operation. Incidentally, the display unit 66 is constituted by a touch panel or the like, and may also function as an input unit.

Registration Method

Figure 10:
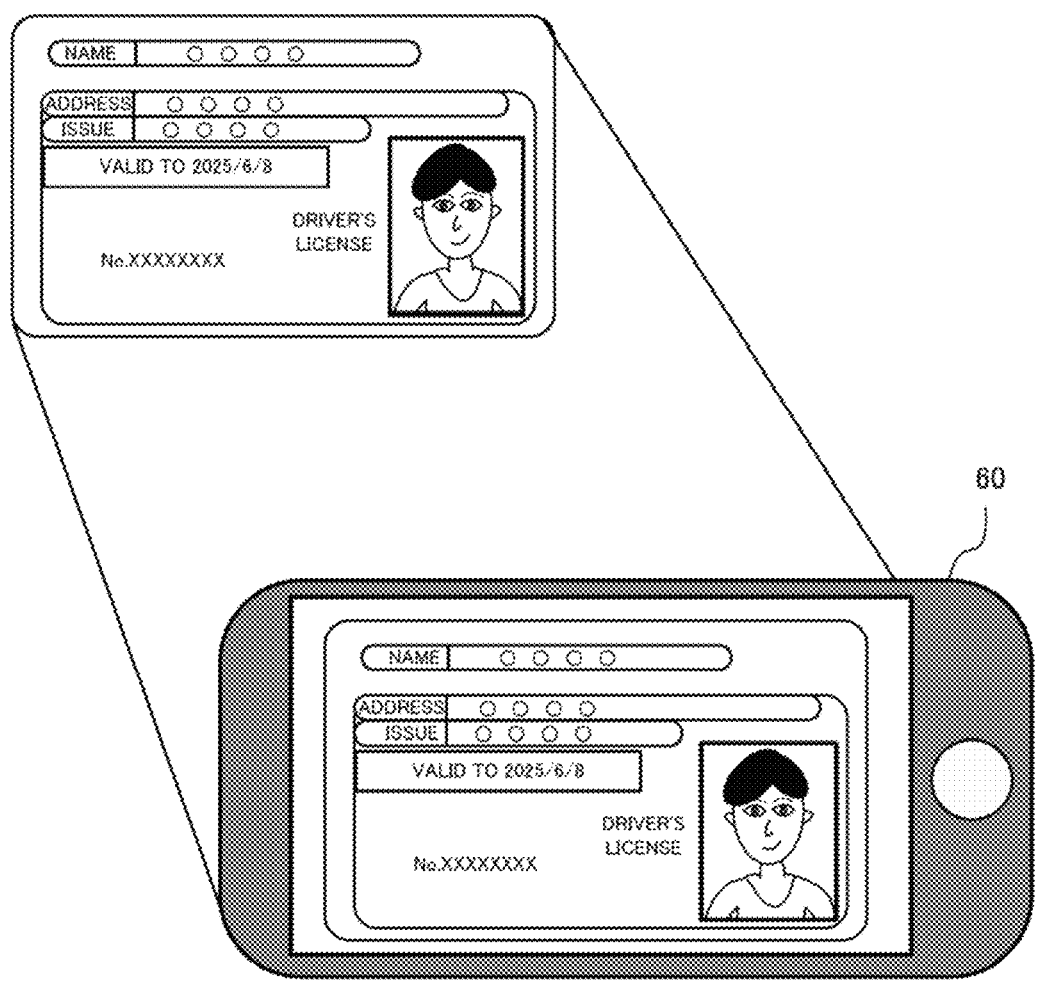
FIG. 10 shows a manner of photographing a certificate image.

Next, a method of registering the certificate image will be specifically described. First, the operator photographs a certificate image. FIG. 10 shows a manner of photographing a certificate image. As shown, the operator operates the camera of the terminal device 60, and the certificate photographing unit 61 photographs a certificate 40 which is a driver's license. In one example in this case, when the operator activates the registration application and taps the photographing button, the camera of the terminal device 60 photographs the certificate. In another example, when the operator activates the registration application, the registration application may display the count down "3, 2, 1" at an appropriate timing and automatically photographs the certificate 40 by the camera. In yet another example, when the operator activates the registration application, the registration application automatically starts the camera of the terminal device 60, and detects that the certificate 40 is in the photographed image of the camera and automatically photographs the certificate 40, like a QR code (registered trademark) reader generally used in a smart phone.

Figure 11A:
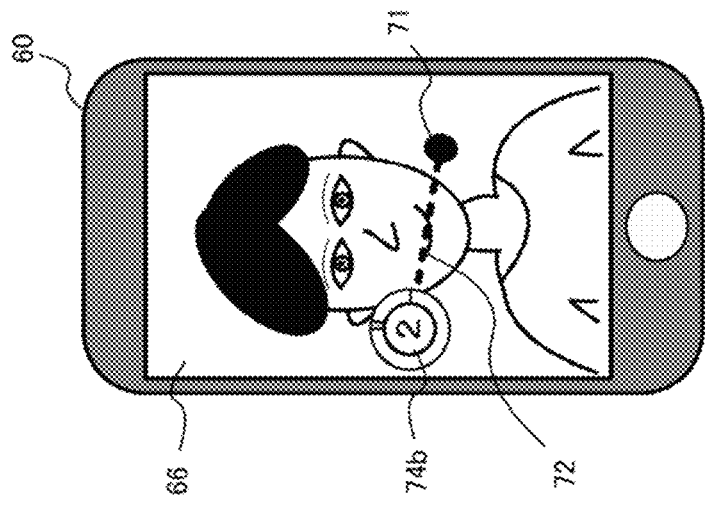
FIGS. 11A to 11C show a manner of photographing a face image.
Figure 11B:
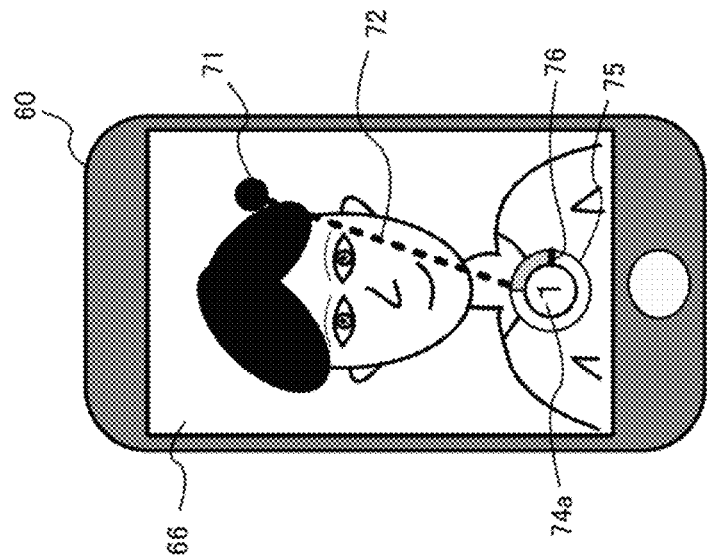
Figure 11C:
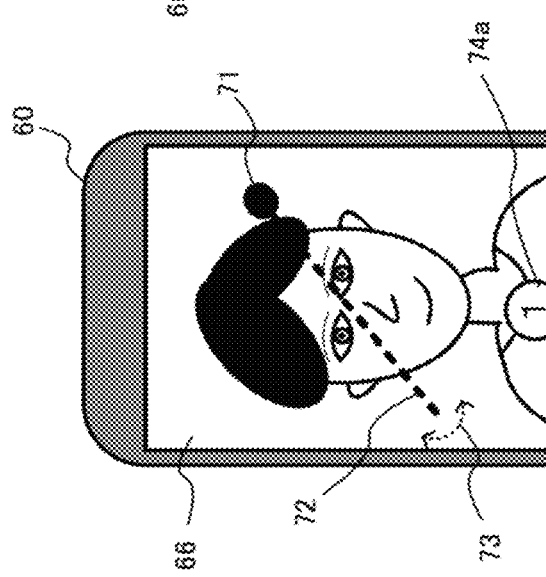

Next, the operator photographs a face image. FIGS. 11A to 11C show a manner of photographing a face image. As shown in FIG. 11A, when photographing the face image, the terminal device 60 displays a cursor 72 on the display unit 66. The cursor 72 moves in accordance with the direction of the operator's face being imaged by the camera. Specifically, the cursor 72 moves using the end point 71 as a starting point, and the direction of the cursor 72 is changed in accordance with the direction of the operator's face in the camera, as indicated by an arrow 73. Further, in the display unit 66, the target point 74a is displayed.

The operator changes the direction of his or her face so that the tip (the end point opposite to the end point 71) of the cursor 72 coincides with the target point 74a. When the tip of the cursor 72 coincides with the target point 74a, a circular gage 75 is displayed around the target point 74a as shown in FIG. 11B. The gauge 75 indicates the duration of the state in which the tip of cursor 72 coincides with the target point 74a (hereinafter referred to as the "cursor coincident state"). The operator maintains the direction of his or her face in the cursor coincident state as shown in FIG. 11B. When the operator maintains the cursor coincident state, the pointer 76 of the gauge 75 moves around the target point 74a. When the duration of the cursor coincidence state reaches a predetermined time (for example, several seconds), the pointer 76 moves around the target point 74a and returns to the 0 o'clock position. When the duration of the cursor coincident state reaches the predetermined time, the terminal device 60 turns off the target point 74a, and displays the next target point 74b as shown in FIG. 11C.

When the next target point 74b is displayed, the operator adjusts the direction of his or her face so that the tip of the cursor 72 coincides with the target point 74b in the same manner and maintains the cursor coincident state for a predetermined period of time. The terminal device 60 repeats this process a predetermined number of times. The reason for performing such process is to confirm that the operator is actually photographing his or her face image using the terminal device. That is, when the operator attempts to register a certificate by displaying another person's face image or the like on the terminal device 60, it is not possible to place the tip of the cursor 72 on the target point 74, and hence the registration operation is stopped.

The face image photographing unit 62 photographs the face image of the operator while the operator places the tip of the cursor 72 on the target point 74 a predetermined number of times. For example, the face image photographing unit 62 photographs the face image of the operator while the operator maintains the direction of the face in the state that the cursor 72 coincides with the target point 74.

Thus, when the certificate image and the face image are obtained, the registration unit 63 registers the certificate image with the storage unit 64 when it determines that there is no falsification in the certificate by using the certificate image and that the operator is the same person as the owner of the certificate by using the face image.

Display Method

Figure 12C:
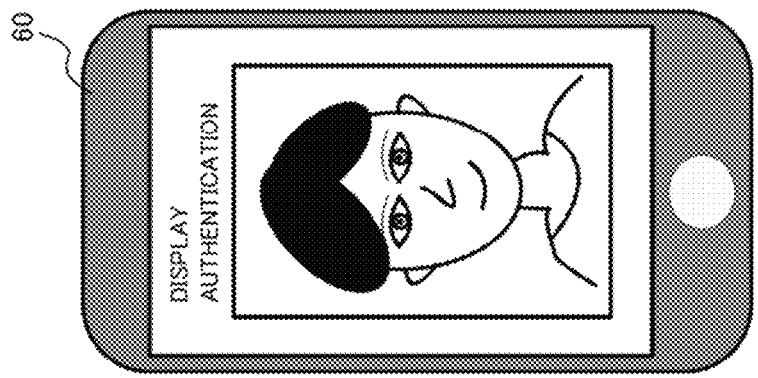
FIGS. 12A to 12C are examples of authentication method for displaying a certificate image.
Figure 12B:
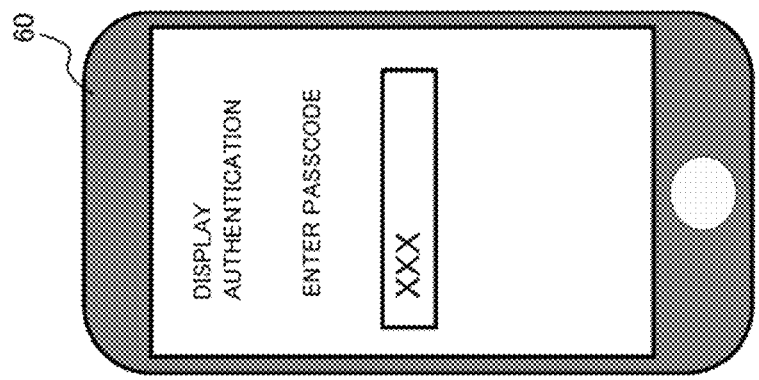
Figure 12A:
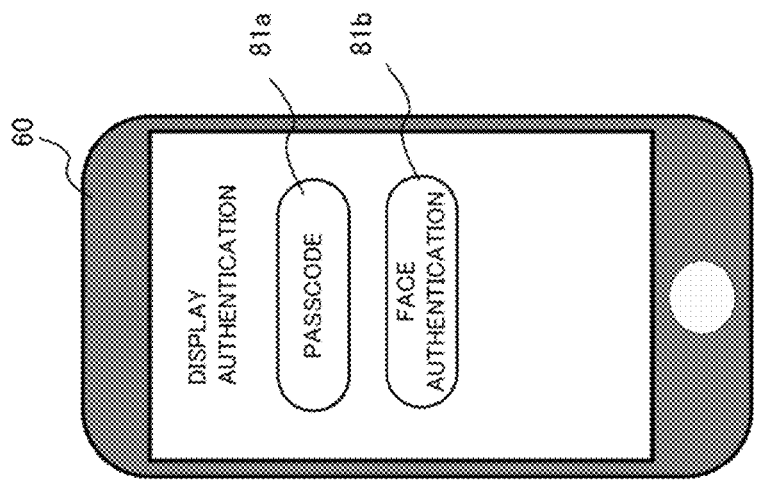

Next, the display method of the registered certificate image will be described. FIGS. 12A to 12C show an example of an authentication method for displaying certificate image. When the terminal device 60 is set to a certificate display mode, the display authentication screen shown in FIG. 12A is displayed. The user selects the method of display authentication by the buttons 81a and 81b. When the user selects the passcode button 81a, the terminal device 60 displays the passcode entry screen shown in FIG. 12B. The user performs display authentication by inputting the passcode registered in advance. On the other hand, when the user selects the button 81b of the face authentication, the terminal device 60 displays the face authentication screen shown in FIG. 12C. The user performs display authentication by displaying his or her face with a camera.

Figure 13A:
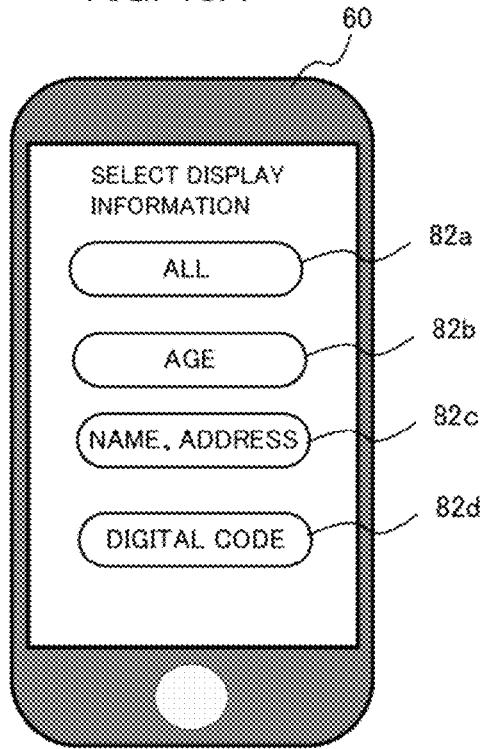
FIGS. 13A to 13D are examples of selecting display information.

When the display authentication is successful in any method, the terminal device 60 displays the display information selection screen shown in FIG. 13A. The display information selection screen includes a button 82a designating all information as the display information, a button 82b designating an age, a button 82c designating a name and an address, and a button 82d designating a digital code.

Figure 13B:
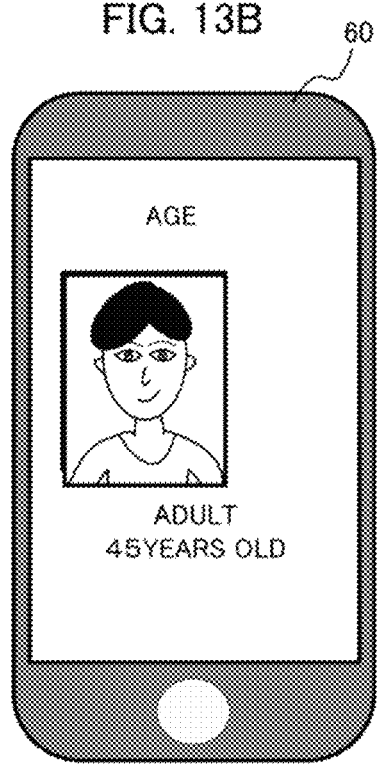
Figure 13C:
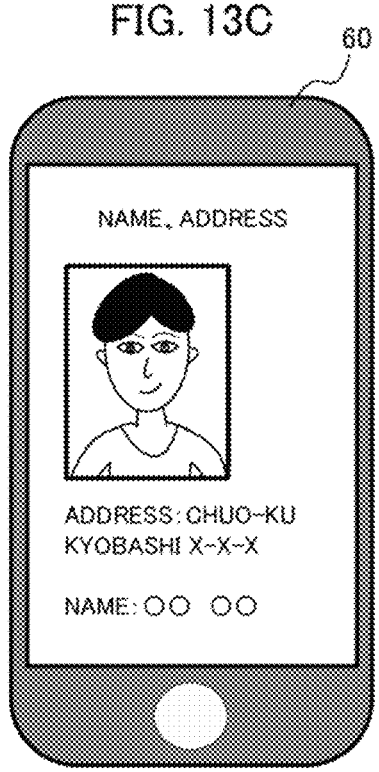
Figure 13D:
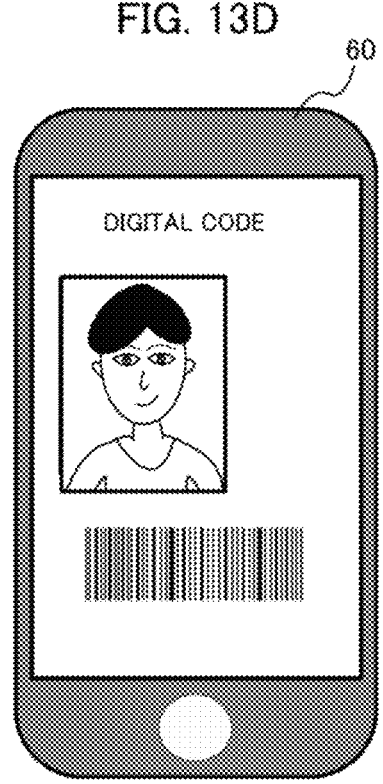

When the user selects the button 82b in the display information selection screen, the user's face image and age are displayed as shown in FIG. 13B. When the user selects the button 82c in the display information selection screen, a face image of the user and the address and name of the user are displayed as shown in FIG. 13C. When the user selects the button 82d in the display information selection screen, the user's face image and a digital code are displayed as shown in FIG. 13D. Note that the digital code is generated by encoding the name, the address, the driver's license number, and other personal information included in the certificate. Personal information can be acquired by reading the displayed digital code with the corresponding code reader.

Figure 14A:
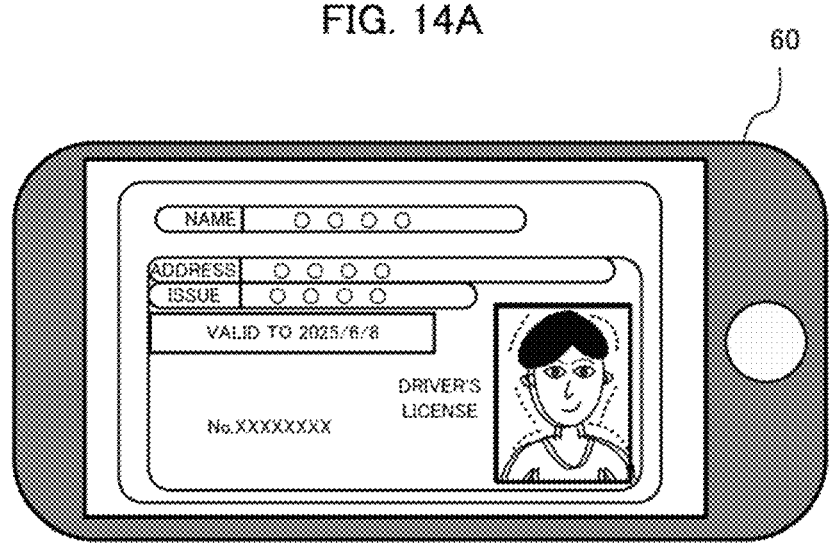
FIGS. 14A and 14B are examples of displaying a registered certificate image in its entirety.

On the other hand, when the user selects the button 82a in the display information selection screen, the entire certificate image is displayed as shown in FIG. 14A. Here, the face image is displayed with some movement in the displayed certificate image. For example, the face image is displayed as a moving image in which the direction of the face changes slightly in the left-right direction or the up-down direction. Thus, it can be proven that the displayed image is not the image generated by simply photographing the image of the certificate and displaying it on the terminal device 60. That is, the movement of the face image proves that the certificate image has been formally registered using the registration application of the terminal device 60.

Figure 14B:
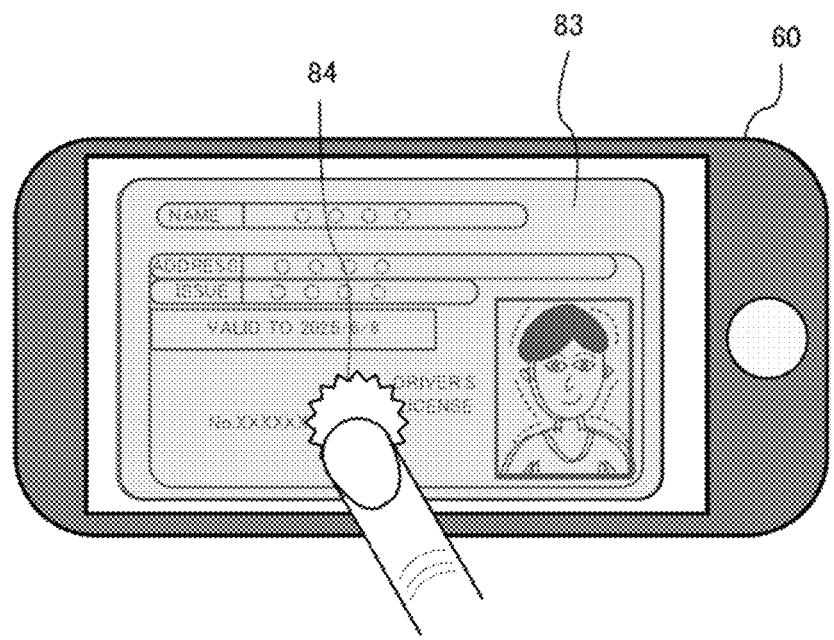

Further, if the user touches a part of the screen of the terminal device 60 as shown in FIG. 14B when the entire certificate image is being displayed, the region of the certificate is colored with a predetermined color, as shown by the reference numeral 83. Further, a pointer 84 of a predetermined shape is displayed at a position touched by a user with a finger on the display screen of the terminal device 60. As the user moves the position of the finger on the display screen, the pointer 84 moves in accordance with the movement of the user's finger. In this way, coloring and displaying the pointer 84 at the touched position when the user touches the display are methods for indicating that the terminal device 60 is not simply displaying the photographed image of the certificate, but displaying the certificate image formally registered using the registration application.

Fourth Example Embodiment

Figure 15:
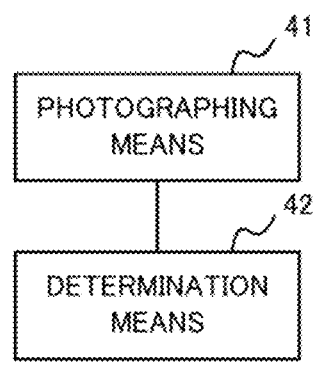
FIG. 15 is a block diagram showing a functional configuration of an information processing device according to a fourth example embodiment.

FIG. 15 is a block diagram illustrating a functional configuration of an information processing device 40 according to the fourth example embodiment. The information processing device 40 includes a photographing means 41 and a determination means 42. The photographing means 41 photographs a certificate and generates a photographed image. The determination means 42 determines authenticity of the certificate based on appearance of a surface of the certificate in the photographed image.

Figure 16:
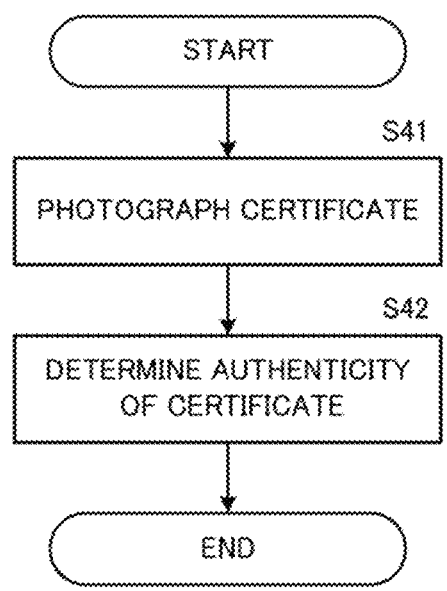
FIG. 16 is a flowchart of information processing according to the fourth example embodiment.

FIG. 16 is a flowchart illustrating information processing according to the fourth example embodiment. The photographing means 41 photographs a certificate and generates a photographed image (step S41). The determination means 42 determines authenticity of the certificate based on appearance of a surface of the certificate in the photographed image (step S42). Then, the processing ends.

A part or all of the example embodiments described above may also be described as the following supplementary notes, but not limited thereto.

Supplementary Note 1

An information processing device comprising:
a photographing means for photographing a certificate and generating a photographed image; and
a determination means for determining authenticity of the certificate based on appearance of a surface of the certificate in the photographed image.

Supplementary Note 2

The information processing device according to Supplementary note 1,
wherein the photographing means photographs the certificate in a state irradiated with an illumination light, and
wherein the determination means determines the authenticity of the certificate based on a reflection area of the illumination light on the surface of the certificate.

Supplementary Note 3

The information processing device according to Supplementary note 2, wherein the determination means determines the authenticity of the certificate based on at least one of luminance and an area in the reflection area.

Supplementary Note 4

The information processing device according to Supplementary note 2 or 3, wherein the determination means determines the authenticity of the certificate based on a shape or texture of the reflection area.

Supplementary Note 5

The information processing device according to any one of Supplementary notes 2 to 4, wherein the determination means determines the authenticity of the certificate based on whether or not the reflection area exists within a predetermined range in the photographed image.

Supplementary Note 6

The information processing device according to any one of Supplementary notes 1 to 5, wherein the determination means determines the authenticity of the certificate based on an optical pattern on the surface of the certificate.

Supplementary Note 7

The information processing device according to Supplementary note 6, wherein the determination means determines the authenticity of the certificate based on presence or absence of the optical pattern on the surface of the certificate.

Supplementary Note 8

The information processing device according to Supplementary note 6 or 7, wherein the determination means determines the authenticity of the certificate based on whether or not the optical pattern matches a predetermined pattern.

Supplementary Note 9

The information processing device according to any one of Supplementary notes 6 to 8, wherein the determination means determines the authenticity of the certificate based on whether or not the optical pattern exists within a predetermined range in the photographed image.

Supplementary Note 10

The information processing device according to any one of Supplementary notes 1 to 9, wherein the determination means integrates determination results for a plurality of photographed images generated from a same certificate to determine the authenticity of the certificate.

Supplementary Note 11

The information processing device according to any one of Supplementary notes 1 to 9,
wherein the photographing means generates a photographed image in a state irradiated with an illumination light and a photographed image in a state not irradiated with the illumination light, and
wherein the determination means determines the authenticity of the certificate based on the photographed image in the state irradiated with the illumination light and the photographed image in the state not irradiated with the illumination light.

Supplementary Note 12

The information processing device according to any one of Supplementary notes 1 to 11, further comprising an acceleration sensor,
wherein the photographing means outputs an output value of the acceleration sensor at a time of photographing the certificate, and
wherein the determination means determines the authenticity of the certificate by using the output value of the acceleration sensor at the time of photographing.

Supplementary Note 13

The information processing device according to Supplementary note 12,
wherein the photographing means generates a photographed image in a condition that the certificate is placed horizontally, and
wherein the determination means determines the authenticity of the certificate by comparing an inclination between the certificate and the photographing means calculated based on the photographed image and an inclination between the certificate and the photographing means calculated using the output value of the acceleration sensor.

Supplementary Note 14

The information processing device according to Supplementary note 12,
wherein the photographing means outputs a plurality of photographed images and a plurality of output values of the acceleration sensor by photographing the certificate from different angles, and
wherein the determination means determines the authenticity of the certificate by comparing a difference between the inclination of the certificate and the photographing means calculated based on the plurality of photographed images with a difference between the inclination of the certificate and the photographing means calculated using the plurality of output values.

Supplementary Note 15

The information processing device according to any one of Supplementary notes 1 to 14, further comprising a registration means for registering the photographed image of the certificate determined to be true by the determination means with a storage unit.

Supplementary Note 16

The information processing device according to Supplementary note 15, wherein the registration means registers the photographed image of the certificate determined to be true by the determination means with the storage unit after correcting the photographed image to an image photographed from a direction directly facing the certificate.

Supplementary Note 17

The information processing device according to any one of Supplementary notes 1 to 14, further comprising a registration means for registering information and an image included in the photographed image determined to be true by the determination means with the storage unit.

Supplementary Note 18

The information processing device according to any one of Supplementary notes 1 to 16, wherein the photographing means includes a guiding means for presenting guidance information to a user so as to photograph the certificate at a predetermined inclination with respect to the certificate.

Supplementary Note 19

An information processing method comprising:
photographing a certificate and generating a photographed image; and
determining authenticity of the certificate based on appearance of a surface of the certificate in the photographed image.

Supplementary Note 20

A recording medium recording a program, the program causing a computer to execute:
photographing a certificate and generating a photographed image; and
determining authenticity of the certificate based on appearance of a surface of the certificate in the photographed image.

While the present disclosure has been described with reference to the example embodiments and examples, the present disclosure is not limited to the above example embodiments and examples. Various changes which can be understood by those skilled in the art within the scope of the present disclosure can be made in the configuration and details of the present disclosure.

DESCRIPTION OF SYMBOLS

12 Processor
21, 31 Image capture section
22, 32 Ticket surface position specifying unit
23 Reflection area extraction unit
24, 34 Determination unit
25, 35 Registration unit
33 Hologram pattern extraction unit
40 Information processing device
60, 100, 200 Terminal device

What is claimed is:

1. An information processing device comprising:
a camera;
an acceleration sensor;
a memory configured to store instructions; and
one or more processors configured to execute the instructions to:
cause the camera to photograph a certificate and generate a photographed image; and
determine authenticity of the certificate based on appearance of a surface of the certificate in the photographed image,
wherein the one or more processors are further configured to execute the instructions to:
cause the acceleration sensor to output an output value of the acceleration sensor at a time of photographing the certificate by the camera,
calculate a first inclination which is an inclination of a photographing direction of the camera with respect to the certificate based on the photographed image,
calculate a second inclination which is an inclination of the photographing direction of the camera with respect to the certificate using the output value of the acceleration sensor, and
compare the first inclination and the second inclination to determine the authenticity of the certificate.

2. The information processing device according to claim 1, wherein the one or more processors are further configured to execute the instructions to:
cause the camera to photograph the certificate in a state irradiated with an illumination light, and
determine the authenticity of the certificate based on a reflection area of the illumination light on the surface of the certificate.

3. The information processing device according to claim 2, wherein the one or more processors are further configured to execute the instructions to determine the authenticity of the certificate based on at least one of luminance and an area in the reflection area.

4. The information processing device according to claim 2, wherein the one or more processors are further configured to execute the instructions to determine the authenticity of the certificate based on a shape or texture of the reflection area.

5. The information processing device according to claim 2, wherein the one or more processors are further configured to execute the instructions to determine the authenticity of the certificate based on whether or not the reflection area exists within a predetermined range in the photographed image.

6. The information processing device according to claim 1, wherein the one or more processors are further configured to execute the instructions to determine the authenticity of the certificate based on an optical pattern on the surface of the certificate.

7. The information processing device according to claim 6, wherein the one or more processors are further configured to execute the instructions to determine the authenticity of the certificate based on presence or absence of the optical pattern on the surface of the certificate.

8. The information processing device according to claim 6, wherein the one or more processors are further configured to execute the instructions to determine the authenticity of the certificate based on whether or not the optical pattern matches a predetermined pattern.

9. The information processing device according to claim 6, wherein the one or more processors are further configured to execute the instructions to determine the authenticity of the certificate based on whether or not the optical pattern exists within a predetermined range in the photographed image.

10. The information processing device according to claim 1, wherein the one or more processors are further configured to execute the instructions to integrate determination results for a plurality of photographed images generated from a same certificate to determine the authenticity of the certificate.

11. The information processing device according to claim 1,
wherein the one or more processors are further configured to execute the instructions to cause the camera to generate a photographed image in a state irradiated with an illumination light and a photographed image in a state not irradiated with the illumination light, and
wherein the one or more processors determine the authenticity of the certificate based on the photographed image in the state irradiated with the illumination light and the photographed image in the state not irradiated with the illumination light.

12. The information processing device according to claim 1, wherein the one or more processors cause the camera to generate a photographed image in a condition that the certificate is placed horizontally.

13. The information processing device according to claim 1,
wherein the one or more processors are further configured to execute the instructions to cause the camera to output a plurality of photographed images and output a plurality of output values of the acceleration sensor by photographing the certificate from different angles, and
wherein the one or more processors are further configured to execute the instructions to determine the authenticity of the certificate by comparing a difference between the inclination of the certificate and the camera calculated based on the plurality of photographed images with a difference between the inclination of the certificate and the camera calculated using the plurality of output values.

14. The information processing device according to claim 1, wherein the one or more processors are further configured to execute the instructions to register the photographed image of the certificate that was authenticated with a storage unit.

15. The information processing device according to claim 14, wherein the one or more processors are further configured to execute the instructions to register the photographed image of the certificate that was authenticated with the storage unit after correcting the photographed image to an image photographed from a direction directly facing the certificate.

16. The information processing device according to claim 1, wherein the one or more processors are further configured to execute the instructions to register information and an image included in the photographed image that was authenticated with the storage unit.

17. The information processing device according to claim 1, wherein the one or more processors are further configured to execute the instructions to present guidance information to a user so as to photograph the certificate at a predetermined inclination with respect to the certificate.

18. An information processing method executed by an information processing device comprising a camera and an acceleration sensor, the method comprising:
   causing the camera to photograph a certificate and generating a photographed image; and
   determining authenticity of the certificate based on appearance of a surface of the certificate in the photographed image,
   wherein the determining the authenticity of the certificate comprises:
      causing the acceleration sensor to output an output value of the acceleration sensor at a time of photographing the certificate by the camera;
      calculating a first inclination which is an inclination of a photographing direction of the camera with respect to the certificate based on the photographed image;
      calculating a second inclination which is an inclination of the photographing direction of the camera with respect to the certificate using the output value of the acceleration sensor; and
      comparing the first inclination and the second inclination to determine the authenticity of the certificate.

19. A non-transitory computer-readable recording medium recording a program, the program causing a computer of an information processing device comprising a camera and an acceleration sensor to execute:
   causing the camera to photograph a certificate and generating a photographed image; and
   determining authenticity of the certificate based on appearance of a surface of the certificate in the photographed image,
   wherein the determining the authenticity of the certificate comprises:
      causing the acceleration sensor to output an output value of the acceleration sensor at a time of photographing the certificate by the camera;
      calculating a first inclination which is an inclination of a photographing direction of the camera with respect to the certificate based on the photographed image;
      calculating a second inclination which is an inclination of the photographing direction of the camera with respect to the certificate using the output value of the acceleration sensor; and
      comparing the first inclination and the second inclination to determine the authenticity of the certificate.

* * * * *